Dec. 23, 1952 A. F. SHIELDS 2,622,493
FOLDING MACHINE
Filed May 7, 1949 9 Sheets-Sheet 1

INVENTOR.
ALBERT F. SHIELDS
BY Ostrolenk & Faber
ATTORNEYS

Dec. 23, 1952 A. F. SHIELDS 2,622,493
FOLDING MACHINE
Filed May 7, 1949 9 Sheets-Sheet 4

INVENTOR.
ALBERT F. SHIELDS
BY Ostrolenk & Faber
ATTORNEYS

Dec. 23, 1952  A. F. SHIELDS  2,622,493
FOLDING MACHINE

Filed May 7, 1949  9 Sheets-Sheet 6

INVENTOR.
ALBERT F. SHIELDS
BY Ostrolenk + Faber
ATTORNEYS

Dec. 23, 1952   A. F. SHIELDS   2,622,493
FOLDING MACHINE
Filed May 7, 1949   9 Sheets-Sheet 8

INVENTOR.
ALBERT F. SHIELDS
BY Ostrolenk & Faber
ATTORNEYS

Patented Dec. 23, 1952

2,622,493

UNITED STATES PATENT OFFICE 2,622,493

FOLDING MACHINE

Albert F. Shields, Forest Hills, N. Y., assignor to S & S Corrugated Paper Machinery Co., Inc., Brooklyn, N. Y., a corporation of New York Application May 7, 1949, Serial No. 91,953

4 Claims. (Cl. 93—49)

My present invention is a continuation-in-part of Patent No. 2,583,712, issued January 29, 1952, and relates to folding machines and more particularly to a folding machine of the type generally shown in my prior Patent No. 2,336,507 wherein large size corrugated board or other paper blanks are to be passed from a stack through various folding elements and delivered to a tape applying mechanism.

In the making of cartons, it is necessary first to crease and slot the blanks in order properly to prepare them for the folding operation. Heretofore and prior to the advent of a specific folding machine for operating rapidly on blanks, it has been customary to fold these blanks manually and feed them into the taping machine. The folding operation for an ordinary square tubular box comprises bending over the two outer panels on the score lines so that the edges of the panels meet to form a collapsed tube. The maximum speed which can be expected from manual folding is of the order of from 10 to 30 blanks per minute.

In addition, where the blanks have been incorrectly creased or scored prior to folding, it becomes necessary for the operator when bringing the edges of the folded panel together to twist the panels around the crease and adjust and reform the crease in order that the tube may be squared properly. This operation is very time consuming when performed manually; also the operator tends readily to place aside and discard blanks the panels of which are visibly askew, thus leading to a great deal of waste and additional operations.

My novel machine has for its primary purpose the rapid folding and delivering of the blanks at a rate ranging upward from 120 a minute to as high as 180 blanks per minute and even higher.

My novel device also embodies elements which will straighten and reform the crease in any blank in which the panels when folded are askew without slowing the rate of folding in any way.

Primarily my present invention is directed toward improvements in the device shown in my Patent No. 2,336,507 which improvements were invented in order to increase the folding rate of my machine, also to increase the range of the machine with regard to sheet sizes and materials to improve the reliability of operation and also to shorten the set-up time. These improvements include a stacking arrangement which will permit delivery of warped blanks to the folding apparatus, also where the side gauges are automatically positioned when the folding width is set; prefolding elements which will start the panels to be folded around their bent line just prior to the point where the blanks reach the folding plates, improved plates which are curved to extend the prefolding action; improved stop means which act on the unfolded portion of the blank for holding the blanks in proper position during folding; improved re-creasing means to reform the creases in blanks, the panels of which would otherwise be askew, improved means for adjusting the machine to various sizes and arrangements of the blanks; and improved means for simplifying and integrating the drives for the various elements of the machine so that each operation will take place at the proper instant.

Also, my novel machine includes added means to ensure bringing the blanks up to the stop under all conditions and preventing rebound; stripping means to ensure that the folded blanks clear the retracted stop; folding bar limiting rolls to limit deflection of the folding bars and guide the folded blank into the straightening section.

Another and important object of my present invention is the provision of a two-speed drive for the folding plates of my folding machine.

This makes it possible to utilize the full capacity of the machine where blanks of half or less than the standard length are folded. The added speed of operation of the folding plates is, of course, accompanied by the addition of slats to the folding chain.

The foregoing and many other objects of my invention will become apparent in the following description and drawings in which.

Figure 1:
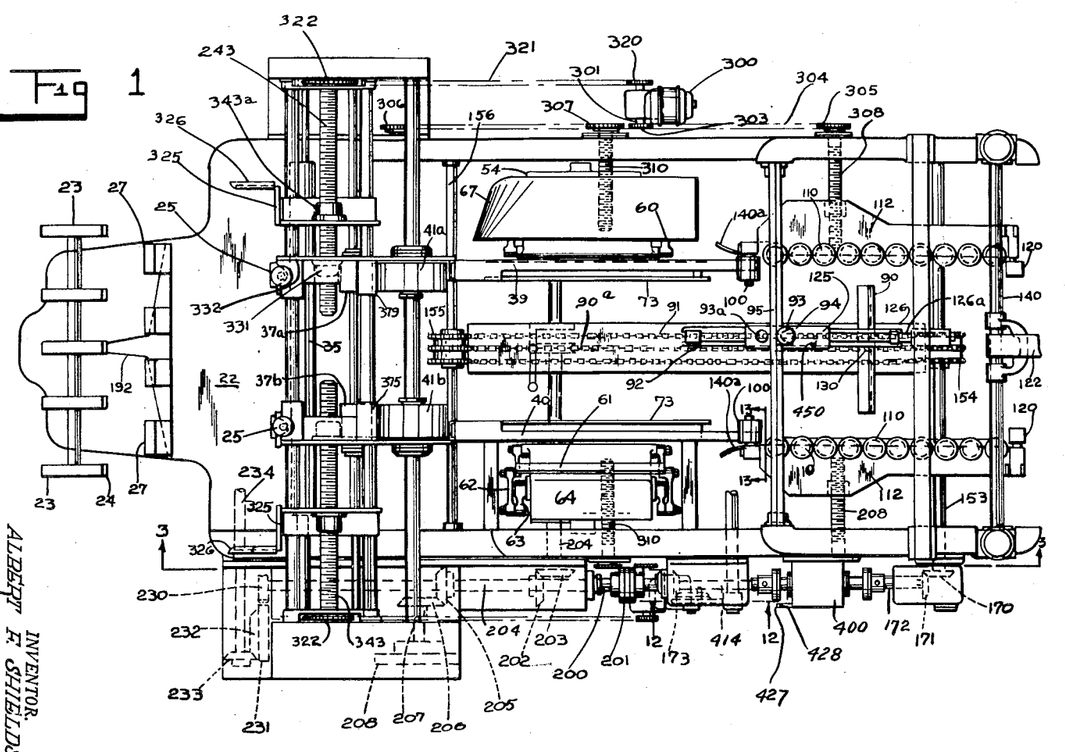
Figure 1 is a top plan view of my novel improved folding machine.
Figure 2:
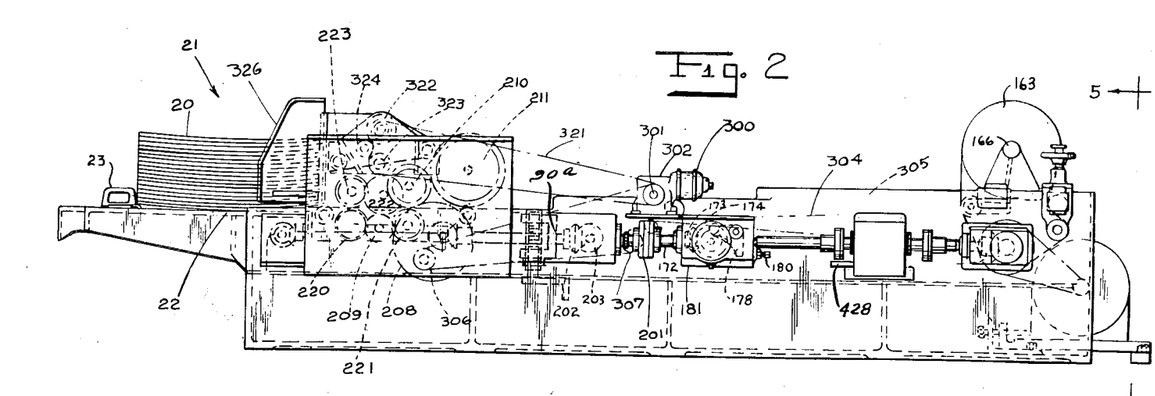
Figure 2 is a side view of the novel folding machine of Figure 1.
Figure 3:
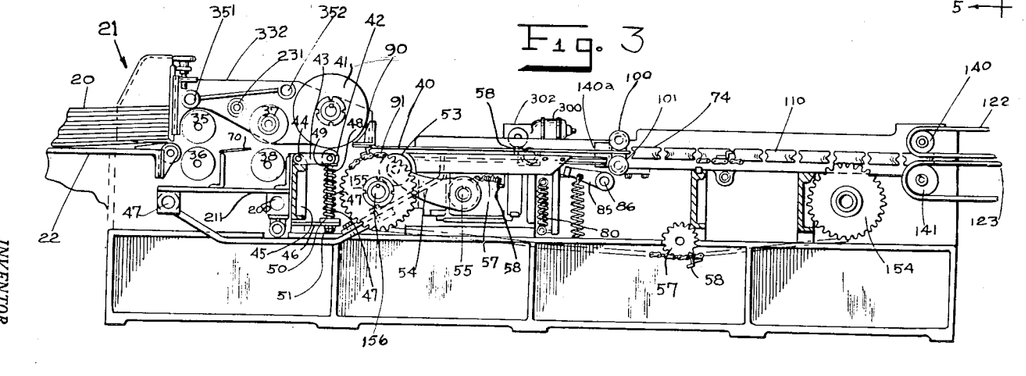
Figure 3 is a side view partly in cross-section corresponding to the side view of Figure 2 taken on line 3—3 of Figure 1.

Referring now to Figures 1, 2, and 3, a stack of blanks 20 is placed on the bed of the stacking section 21 of the machine between the rear gauge 23 and the front gauge 25. The bottom blank in the stack is fed toward the right by the feed slat 27 through the spaces 30, 30 (Figure 6) between the front gauges 25, 25 and the bar 31 on which the stack is placed. The spaces 30 are adjusted so that they are just high enough to permit one of the blanks 20 to pass through while holding back the remainder of the stack.

The blank passing through the spaces 30 passes over the bar 31 and the idling roller 32, the function of which is hereinafter described and then is pushed by the feed slat 27 between the upper and lower feed rolls 35 and 36, respectively (Figure 3). Feed rolls 35 and 36 engage the blank and carry it forward to the upper and lower feed rolls 37 and 38. Feed roll 38 on the underside of the blank extends across the width of the machine whereas the upper feed roll 37 actually consists of two rollers 37a and 37b (Figure 1) which are adjustable so as to engage only the unfolded panel of the blank; that is, feed rollers 37a and 37b are adjusted so that they are just inside the fold line as defined by the folding bars 39 and 40.

The blanks are then fed by the feed rolls 37 and 38 between the upper and lower feed rolls 41, 42. Upper feed roll 41 actually consists of two feed rolls 41a and 41b occupying the same position, respectively, as feed rolls 37a and 37b as shown in Figure 1 and simultaneously adjustable with said feed rolls. The feed roll 42 on the underside is a single roll extending entirely across the machine and is rotatably mounted between the levers 43 which in turn are rotatably mounted on the pins 44 on opposite sides of the machine carried on lugs of the cross-bracket 45. The lower end of cross-bracket 45 has secured thereto arm 46 having an opening through which the spring guide rod 47 passes. (All of the foregoing may readily be seen in Figure 3.) Compression spring 48 around the guide rod 47 bears between washer 49 on the underside of lever 43 and washer 50 on the upper side of arm 46 and thus biases lever arm 43 upwardly to bias the idling roll 42 upwardly to tightly press the blank against the upper feed roll 41.

The maximum lift of lever 43 and thus the maximum rise of idling roll 42 may be controlled by the adjustable nuts 51 on the lower end of the guide rod 47. Rolls 35 and 38 are also spring biased in a manner similar to the springing means described for roll 42.

Figure 10:
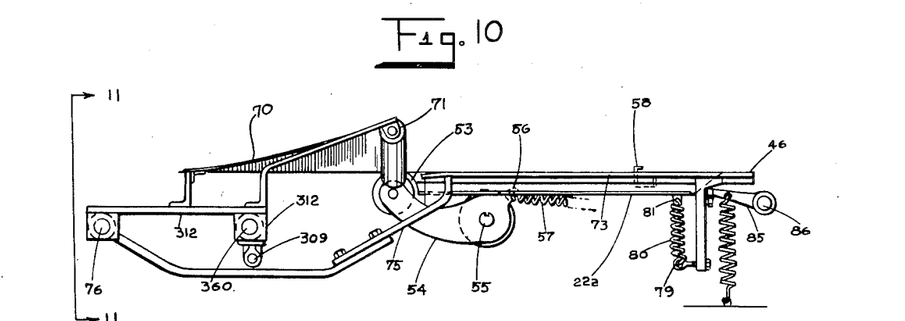
Figure 10 is a side view of the pre-folding means of Figure 9 taken from line 10—10 of Figure 1 looking in the direction of the arrows.

The blank is then carried under the folding bars 39 and 40 and over the feed rolls 53 (see also Figure 10) which are rotatably mounted on each side on arms 54 rotatably supported on a center coaxial with shaft 55. Each of the arms 54 has an extension 56 on the opposite side of the shaft 55 connected to tension spring 57, which in turn is connected to a stationary lug 58 (Figures 3 and 10). The spring 57 biases the feed rolls 53 upwardly to engage and drive the blank. The feed rolls 53 engage the blank on each side by pressing it up against the folding bars 39 and 40 and thus carry the blank forward until its front edge engages the stops 58 mounted on stop bars 73. The forward progress of the blank is thus arrested while the feed rolls 53 continue to rotate and press the blank against the stops 58.

While the blank is in this position with its forward edge against the two stops 58, the creases or scores on which the fold is to take place are in register with the outer sides of the folding bars 39 and 40. This is, of course, obtained by an appropriate adjustment of the machine as hereinafter described, prior to the beginning of a run and by appropriate stacking of the blanks.

While the blank is in the stop position against stop 58, the folding plates 60 (Figure 1) which are each held on their respective cross arms 61 are driven around to fold the blank. Each of the cross arms 61 which supports its folding plate 60 is driven by link 62 which connects it to the crank 63, which in turn is driven from the folding blank operating box 64. The drive for folding plate 60 is thus substantially the same as described in my prior Patent No. 2,336,507.

Figure 9:
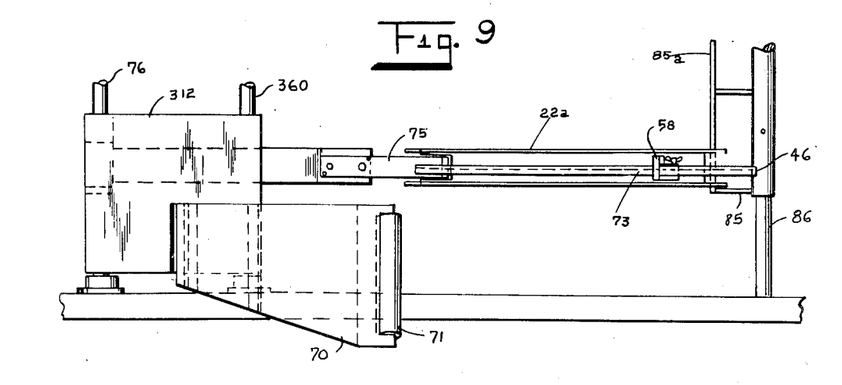
Figure 9 is an enlarged top plan view showing the arrangement of the pre-folding means for preparing the panels of the blanks for folding by the folding prints of my invention.
Figure 11:
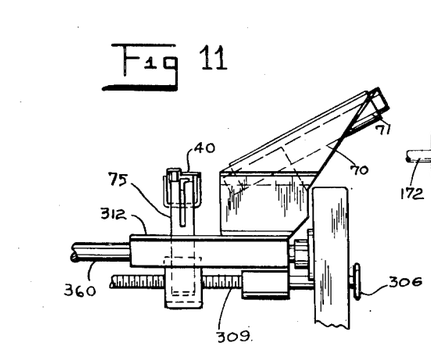
Figure 11 is an end view of the pre-folding means and stop device taken from line 11—11 of Figures 1 and 10 looking in the direction of the arrows.

The folding plate 60 is driven around by the mechanism thus described to fold the side panels of the blank around the folding bars 39 and 40 and to fold them down flat upon the remainder of the blank. The folding operation is facilitated first by reason of the fact that the folding plates 60 and 61 are downwardly bent at 67 in order that the side panels of the blank may readily ride up thereon. Also, the folding operation is further facilitated by means of the deflecting plate 70 on each side (seen specifically in Figures 9 to 11) each of which terminate in an angularly positioned roller 71 so that the side panels are folded up of the order of 25° between plate 70 and roller 71 on each side even before the blank reaches the folding position. The side panels are thus given an initial angularity with respect to the moving blank so that the folding plates need not rotate the side panels through a full 180° but must as shown by an examination of Figure 11 rotate through approximately only 150°.

The stop bars 73 are as shown in Figure 10 supported by the bracket arm 75 which in turn is pivotally supported on the fixed shaft 76 on each side.

The stop bar 73 on each side has a downward extension 78, the lower end of which is connected by eye bolt 79 to the tension spring 80, which in turn is connected to the lug 81 secured to the U-shaped members 22a which are fixed to the width of the folding boxes and adjusted with them. Accordingly, the stop bar 73 on each side is maintained in raised position. The U members 22a serve to support the blank while in the folding section and then also serve to strip the folded blank from the stop when it retracts.

The two downward extensions 78 on each side of the machine each carries a roller 84 which is engaged by the lever bar 85a on the levers 85 on shaft 86. After the folding operation has been completed, the shaft 86 is rotated counterclockwise to rotate the lever 85 counterclockwise and push down the rollers 84 of extensions 78. This pushes down the stop bars 73 which move down with the bracket 75 which in turn rotates about the shaft 76. This in turn pulls down the stops 58 on each side and thus removes the stop members from the leading edge of the blank.

The machine is so arranged and timed that as soon as the stops 58 are depressed by the action of lever 85, slat 90 mounted across the chains 91 moves up into engagement with the rear of the folded blank and moves the blank beneath the hold-down strip 92 which strip is adjustably supported by feed screw 93 operated by knurled knob 94 on the cross bar 95. The hold-down strip 92 is adjusted so that it extends just in front of the stops 58. The front end is curved upwardly so that panels which tend to spring up after being folded will be guided down again and their edges brought to abutting position. As soon as the slat 90 on chains 91 engages and moves it forward further through the machine, the guide presses down on the same between the panels and prevents the folded blank from opening up.

The blank is then carried forward between the limiting rolls 100, 101 which as shown in Figure 3 loosely control the position of the delivery end of folding bars 39 and 40. Since the folding bars 39 and 40 are supported from the front guide elements of the stacking device and since the free or delivery ends of the folding bar are substantially distant from their supports, they may be moved through a small angle.

The rollers 100, 101 above and below, respectively, each of the folding bars 39 and 40 limit the upward and downward movement of the free ends of the folding bars 39 and 40 so that they will not be flexed to too great an extent. These rollers also serve, in addition to controlling the position of the free ends of the folding bars 39 and 40, to control the blank and hold it in a somewhat central position so that the edges of the blank will be properly engaged by the straightening rolls 110.

The straightening rolls 110 are each mounted on stub shafts 111 which in turn are supported on the adjustable plates 112, 112. Straightening rolls 110 on each side are aligned with each other and are provided with grooves as shown in Figure 3 adapted to receive the folded edge of the blank. The plates 112, 112 are adjusted so that the peripheries of the aligned rollers 110 on each side are spaced apart by a distance which is slightly less than the width of the folded blank. The slat 90 forces the blank between the rolls 110 with the edges of the blank riding in the annular grooves on each side. Since the rolls are thus spaced slightly closer together than the width of the blank the crease or fold is adjusted and spread vertically.

The movement of the slat which maintains the body of the blank normal to its direction of travel holds the blank at the correct angles with respect to the rolls 110 so that in a properly folded blank the crease is adjusted regularly on each side. Where the score line was initially incorrect or where the panel was folded improperly, the score lines are adjusted and straightened so that recreasing rolls 120 may then recrease or press the fold properly. The rolls 110 adjust and spread the crease to a greater width at that portion of the blank which has been widened by the skewed folding. As the blank leaves the crease adjusting rolls 110, it passes between the pressure rolls 120, 120 which recreases the blanks as the blanks are delivered. Since the blank is maintained with its side edges exactly parallel to its path of movement by the slat 90, the recreasing operation performed by recreasing rolls 120 forms the crease in exactly the right position.

I have found that panels which have been skewed so that the trailing or leading edge of the panel projects over the edge of the main body of the box by more than a quarter of an inch have been straightened and properly recreased by this operation. Blanks which had been improperly scored so that when folded up the panel would be skewed have been corrected and straightened during the passage through the folding machine.

My machine, therefore, reduces the waste of blanks and makes it possible to utilize blanks even though they have been improperly or carelessly creased or scored.

This type of recreasing operation has also been described in my prior Patent No. 2,336,507 wherein several spaced crease adjusting rolls are shown on each side. While spaced crease adjusting rolls have been able properly to recrease and correct skewed blanks, I have found that by placing the crease adjusting rolls 110 in closely spaced relation as shown in Figures 1 and 3, a greater degree of skew may be corrected.

The hold-down is adjusted forward and back by loosening the screw 93a and sliding the slat back and forth; and is adjusted up and down by screw 93. Each of the said slats 90 mounted across the chains 91 has a recess 130 so that it may readily slide or move on either side of the hold-down slat 92.

The folded blanks are preferably delivered to a taping machine, and the bar 126a serves to hold down the panels of the folded blank right up to the point of tape application. Side guides 140a are provided to guide the blanks into the straightening section without marring the front corners of the box.

The apparatus comprises, as previously pointed out, a number of improved elements, each of which cooperate with each other and with the entire machine in order to provide for increased speed and facility of operation.

Figure 5:
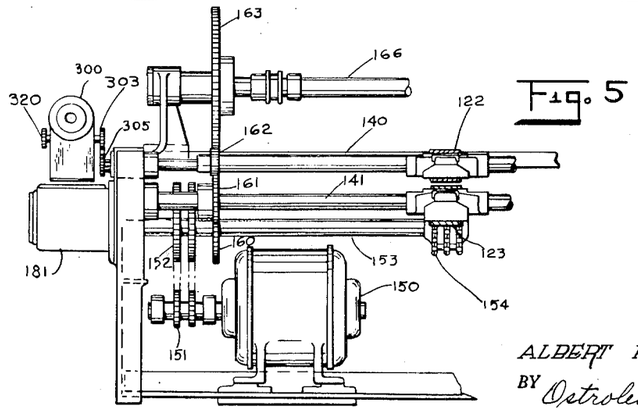
Figure 5 is an end view of my novel machine taken from line 5—5 of Figure 2 looking in the direction of the arrows.

Referring to Figure 5, a variable speed D. C. motor 150 with the sprocket 151 drives the sprocket 152 which is mounted on shaft 153 which carries sprocket 154 of Figure 1. Sprocket 154 provides power to pull the chains 91. Chains 91 are in turn held by idler sprockets 155 on shaft 156 (Figures 1 and 3). Idler sprocket 157 (Figure 3) is adjustably mounted to tighten the chains. Shaft 153 also holds sprocket 160 which in turn drives sprockets 161, 162 and 163 thus driving the lower delivery shaft 141 and the upper delivery shaft 140 and the taper cam shaft 166.

Figure 12:
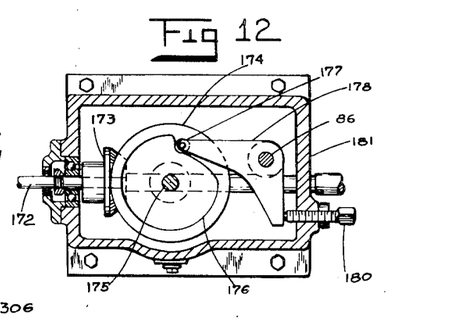
Figure 12 is a side view partly broken away taken on line 12—12 of Figure 1 showing the means for operating the stop device out of stopping position after the blank has been folded.

Referring to Figure 1, the end of shaft 153 holds a bevel gear 170 which drives bevel gear 171 on shaft 172. Bevel gear 173 on shaft 172 (also in Figure 12) drives bevel gear 174 on stud 175 and so drives drop-off cam 176 which is mounted on bevel gear 174. Roller 177 on arm 178 engages the periphery of cam 176; thus an oscillatory motion is imparted to lever 178 and to shaft 86 on which it is mounted; the shaft 86 as mentioned before serves to retract the stop 58. Set screw 180 held in housing 181 engages an arm of lever 178 and serves to limit the angular motion of the lever 178 and also of the shaft 86.

Referring back to Figure 1, the shaft 172 is connected to shaft 200 by means of the coupling 201. Bevel gear 202 on shaft 200 drives bevel gear 203 on shaft 204 which provides power to both of the folding boxes 64. Bevel gear 205 on shaft 200 drives bevel gear 206 on shaft 207 and thus turns the spur gear 208 which also is keyed to shaft 207.

Referring to Figure 2, gear 208 meshes with gear 209, 210 and 211 and thus drives gears 220, 221 and 222. Gear 222 drives gear 223. It can be seen that by means of this gearing the feed rolls 35, 36, 37, 38 and 41 are all driven. Also that gears 35 and 38 are pivotally held on the centers of gears 222 and 209, respectively, so that these feed rolls when spring biased will adjust themselves to any thickness of blank.

Referring back to Figure 1, gear 230 on shaft 200 drives gear 231 which holds level gear 232. Bevel gear 232 drives bevel gear 233 on the kicker drive shaft 234.

Figure 4:
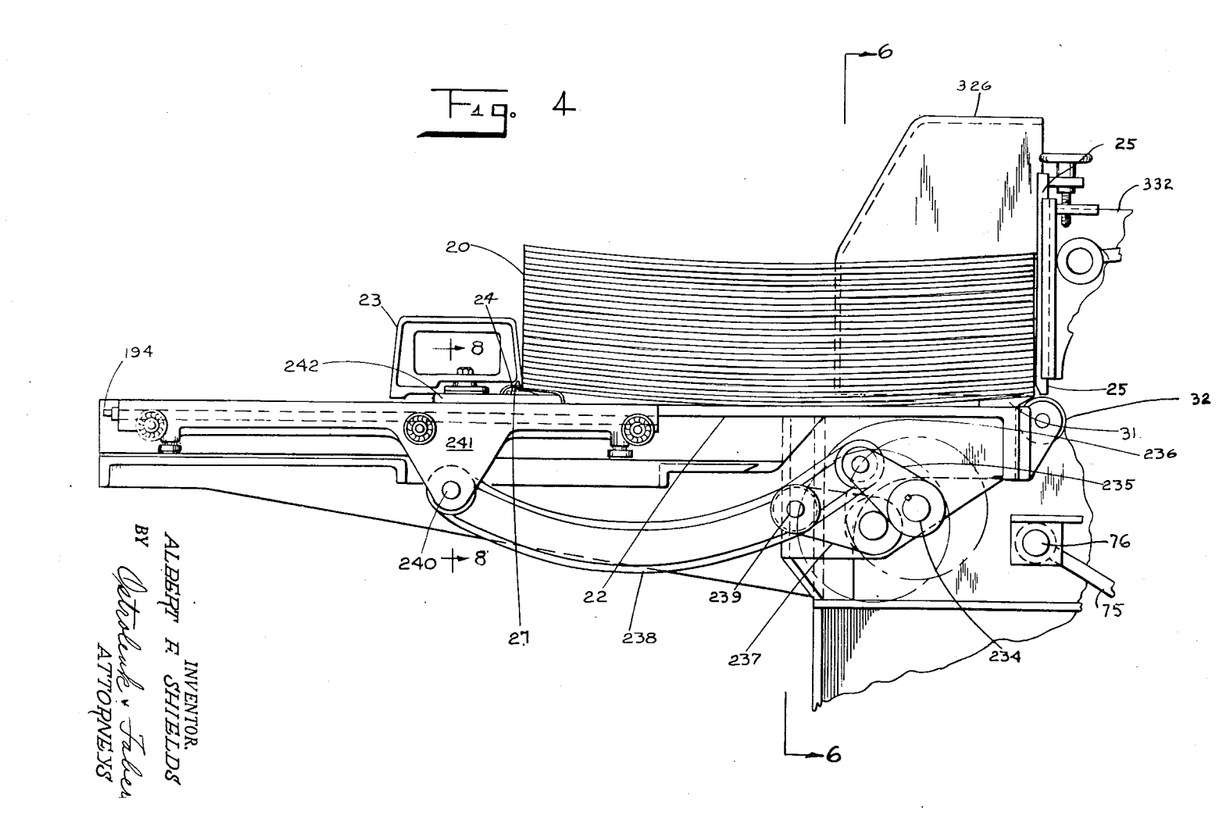
Figure 4 is an enlarged side view showing the stacking and feeding arrangement for the blanks to be folded.

Referring to Figure 4, the crank 235 which is keyed to 234 drives link 236 which in turn drives crank 237 and link 238. Link 238 is a pin-connected link which transfers the variable rotary motion of pin 239 on link 237 to a variable reciprocating motion of pin 240 on kicker carriage 241. Carriage 241 carries the kicker bar 242 in such a manner that the bar is adjustable relatively to the carriage by means of the T-shaped member 243 and the screw 244. The spring kickers 27 are mounted on the kicker bar 242 in order to obtain adjustment for uneven blanks.

All members which engage the edges of the blank are provided with nuts which in turn are driven by screws all of which are driven from a common source on each side of the machine in order to adjust the machine for different widths of blanks.

The motor 300 in Figure 2 drives the shaft 301 through a worm gear reduction 302. Shaft 301 holds a sprocket 303 (Figure 1) which engages a chain 304 which passes over sprockets 305, 306 and 307. Sprockets 305, 306 and 307 drive screws 308, 309 of Figure 10 and 310 of Figure 1, respectively, and these in turn serve to adjust the straightening roll bracket 112, the stop and deflector assembly of Figure 10, and the folding box 64 of Figure 1, respectively. At the other end of shaft 301 is a sprocket 320 which by means of chain 321 drives sprockets 322 and 323. Sprocket 324 is an idler for the purpose of tightening chain 321.

Figure 6:
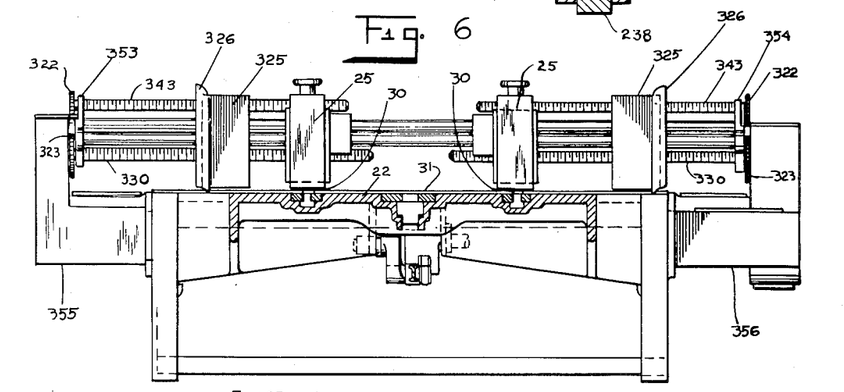
Figure 6 is a view partly in cross-section of the front gauge of the stacking device taken from line 6—6 of Figure 4 looking in the direction of the arrows.
Figures 7, 17, 18:
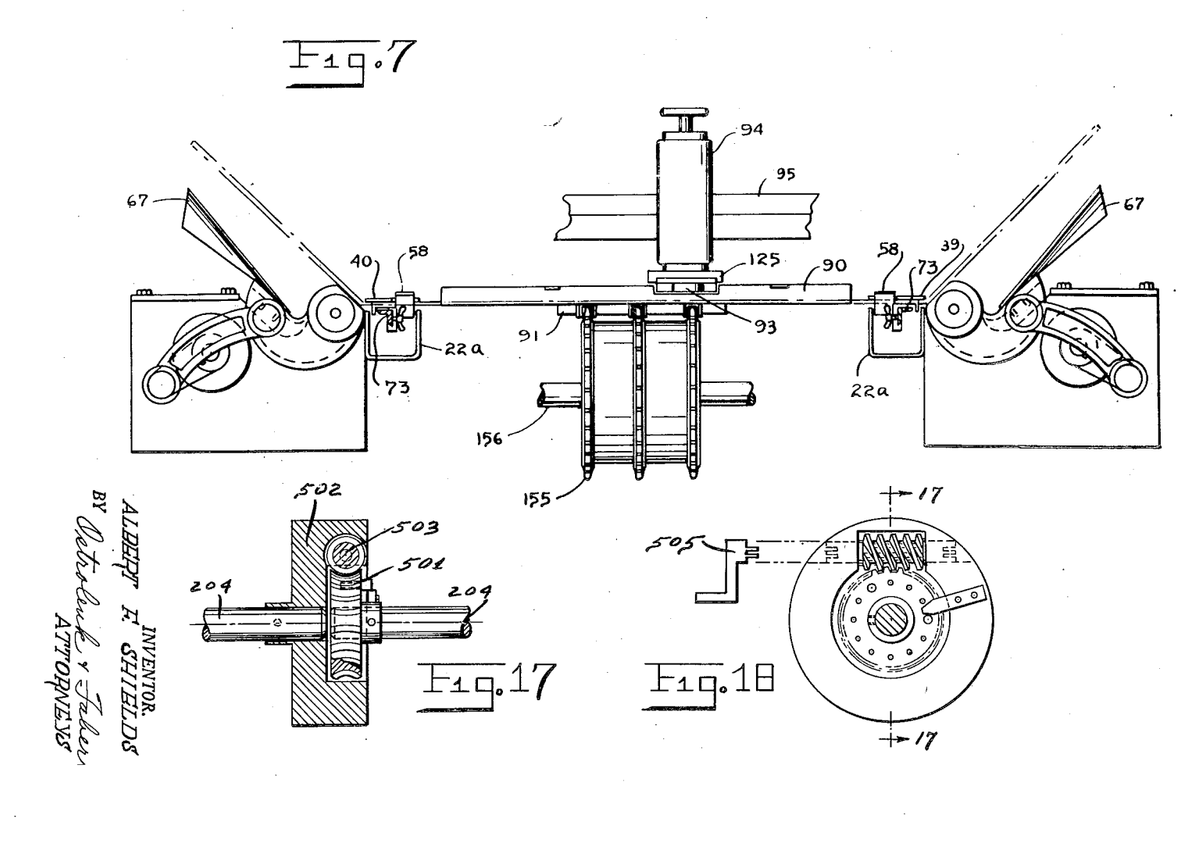
Figure 7 is a cross-sectional view showing the manner in which the blank enters the region of the folding plates.
Figure 17 is a cross-sectional view showing the kicker adjustment mechanism.
Figure 18 is an end view partly in cross-section of the kicker adjustment mechanism.
Figure 8:
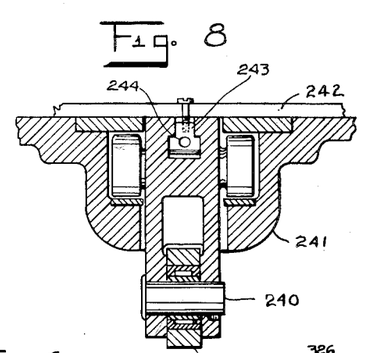
Figure 8 is a cross-sectional view taken on line 8—8 of Figure 4 looking in the direction of the arrows.

Referring to Figure 6, sprocket 322 is keyed to screw 343 which engages nut 343a of Figure 1 mounted on frame 325. Frame 325 holds the side gauge 326 shown also in Figures 2 and 6. Sprocket 323 is keyed to screw 330 which engages nut 331 on frame 332 shown in Figures 1 and 3. Frame 332 serves to hold front gauge 25 and also the folding guide bar 39. Since the sprocket 322 contains half as many teeth as the sprocket 323 and since their respective screws 343 and 330 have the same lead, the frame 325 which holds the side gauge 326 will be moved twice as far as the frame 332 for a given movement of the chain 321 and of the sprocket 320. The frames 325 and 332 are supported on bars 351 and 352 in Figure 3. These bars are held at both ends by the brackets 353 and 354 (Figure 6) which are mounted on housings 355 and 356, respectively.

Referring to Figure 10 in a similar manner, the carriage 312 is mounted on the two bars 76 and 360 which are in turn supported in the side frames of the machine.

In Figures 13 to 16 I have shown my novel speed changing mechanism applied to the folding machine in order to double the number of folding operations of each unit of movement of the chain 91.

It will be noted that the drive to shaft 153 which operates the chain 91 remains the same and is not affected by the speed changer mechanism 400. Bevel gear 171 drives the shaft 172 which through coupling 402 drives shaft 403 rotatably mounted in appropriate bearings in side wall 404 of the speed changer housing 400.

Gear 405 keyed to shaft 403 meshes with and drives gear 407 keyed to shaft 408. Shaft 408 rotates in appropriate bearings 410 in the opposite side walls of housing 400. Shaft 408 carries keyed thereto the reduced diameter gear 412 which meshes with the increased diameter gear 413 rotatably journalled on shaft 414.

Figure 13:
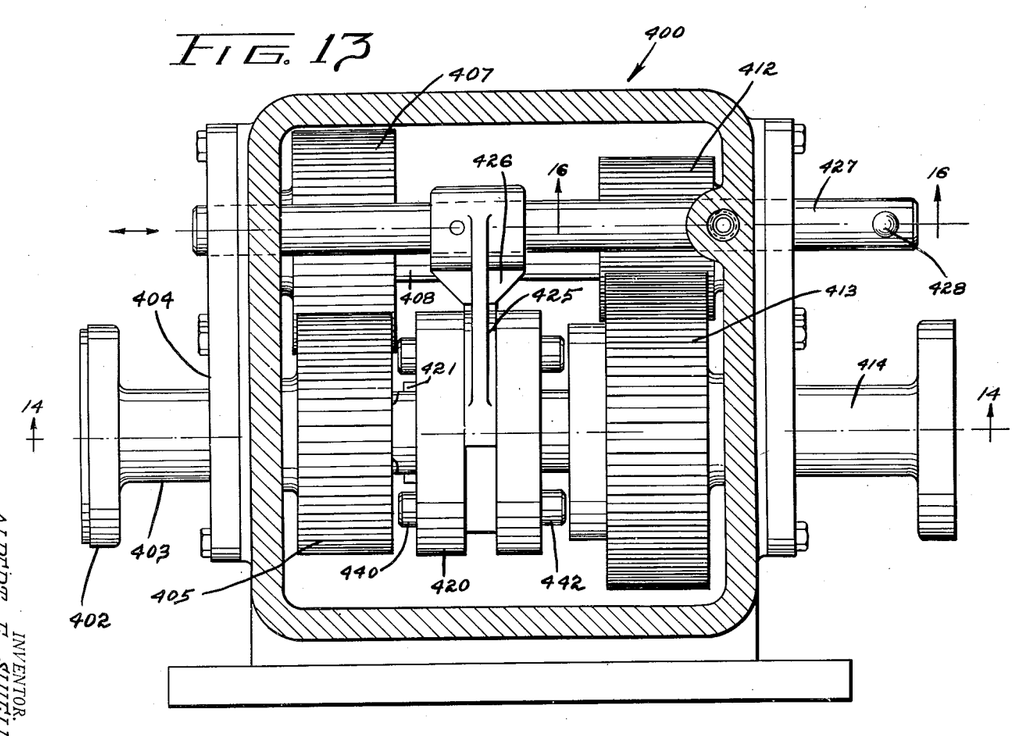
Figure 13 is a cross-sectional view showing the speed changing mechanism.
Figure 14:
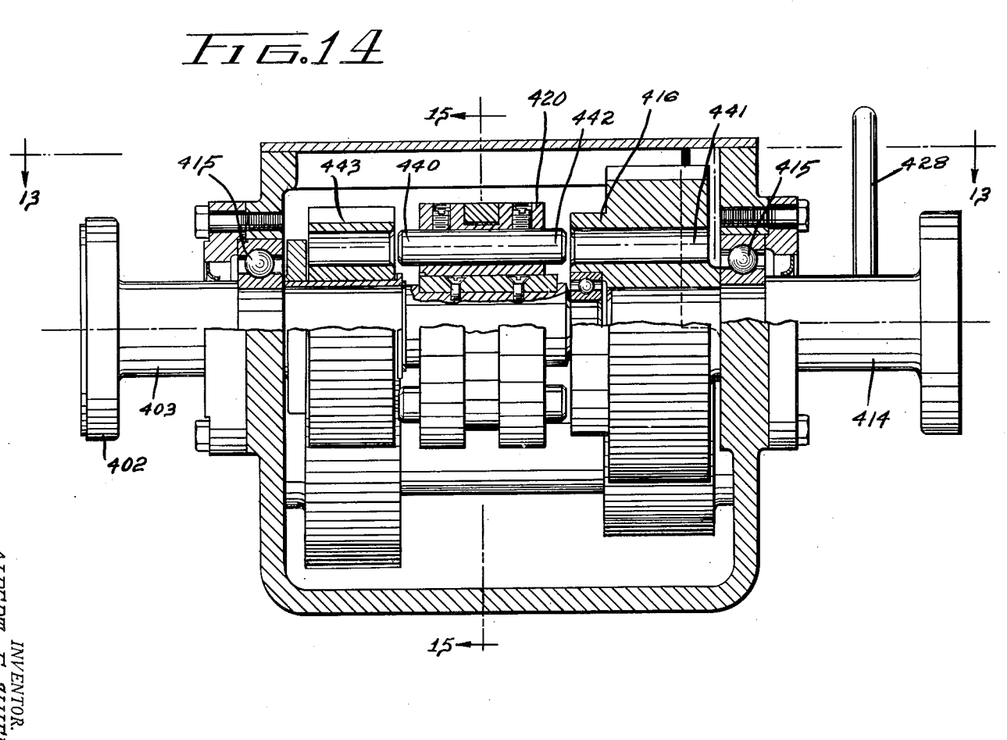
Figure 14 is a cross-sectional view taken on line 14—14 of Figure 13.
Figure 15:
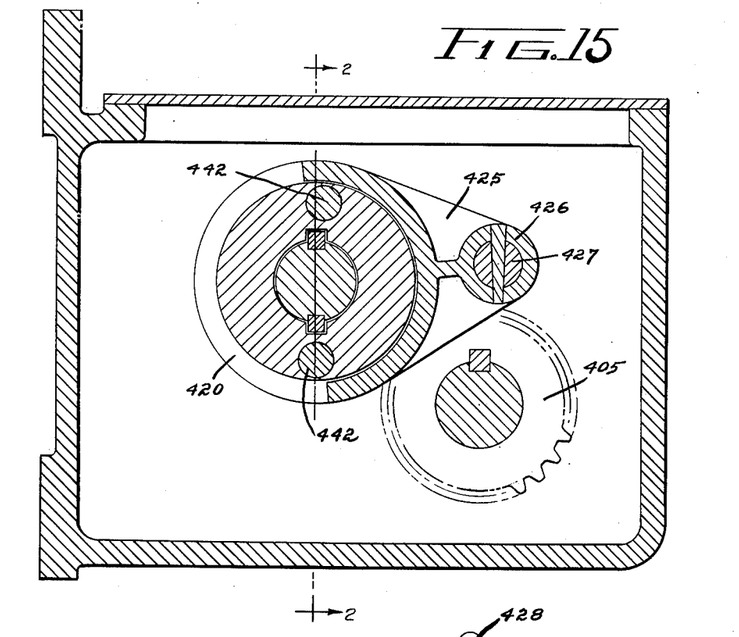
Figure 15 is a cross-sectional view taken on line 15—15 of Figure 14.
Figure 16:
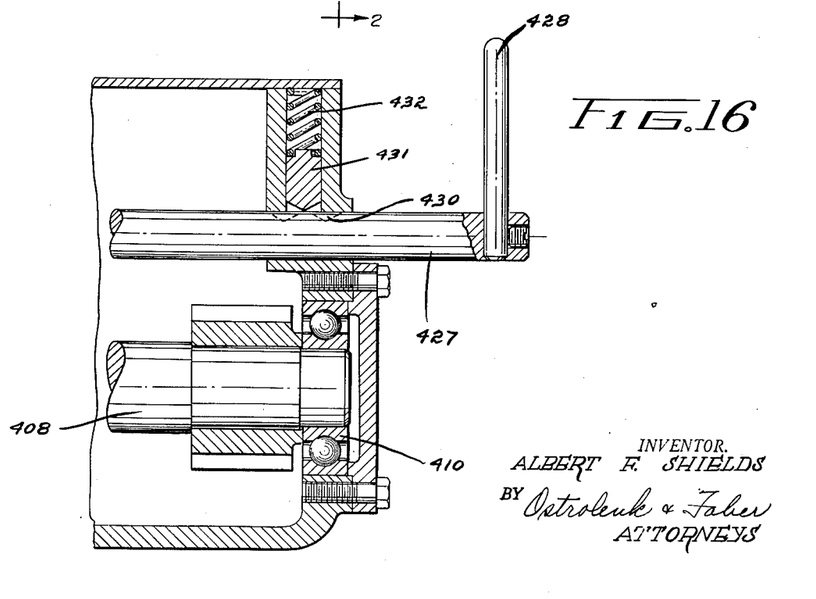
Figure 16 is a cross-sectional view taken on line 16—16 of Figure 13.

Shaft 414 is rotatably mounted in a bearing 415 in the right side of the housing with respect to Figure 13 and the left side of the housing with respect to Figure 14, the opposite end of shaft 414 being rotatably supported in bearing 416 journalled within the gear 405.

The clutch member comprises a rotatable member 420 keyed to shaft 414 by the key 421 but longitudinally slidable along the shaft 414. The rotatable member or clutch plate 420 is rotatably mounted in the clutch shifter 425 and arm 426 of which is keyed to the shift rod 427 having a shift handle 428 at the end.

The shift rod 427 has two predetermined positions, one wherein the clutch member 420 is against gear 405 and the other where the clutch member 420 is against the gear 413.

The shift rod 420 is retained in shifted position in either side by detents 430 in the shift rod which register with the plunger 431 biased against the detents 430 by the compression spring 432 in order to avoid an accidental removal of the clutch plate 420 from driving position.

When the clutch plate 420 is shifted against the face of gear 405, then the clutch pins 440 enter corresponding openings 441 in gear 405 and a driving connection is established from gear 405 to the clutch disc 420 and hence to the shaft 414.

Consequently, the drive from shaft 172 through coupling 402 is a direct one through shaft 403 to shaft 414 and hence to the remainder of the mechanism as previously described.

When the clutch disc 420 is shifted to the right with respect to Figure 13, then pins 442 enter openings 443 in gear 413.

The drive to shaft 414 is now from the bevel gear 171, shaft 172, coupling 402, shaft 403, gears 405, 507, shaft 408, gear 412, gear 413 to the clutch disc 420 and hence to the driven shaft 414 to which it is keyed.

The drive on shaft 414 is consequently at a reduced speed and depending on the gear ratio it may be arranged to be at half speed or any other fraction of the desired speed. Since there is here shown only one set of gears, the half speed setting is the normal setting.

Consequently, the normal speed for the folding plates will be at the drive through gears 412 and 413. When the speed of the folding plates is to be increased, then the drive will occur with the clutch plate 420 shifted against gear 405. Preferably pins 440 and 442 are made sufficiently long so that the pins cannot escape openings 441 or 443 as the case may be on one side until after they have begun to enter the openings on the other side to avoid a loss of registry with both sets of openings.

The bars or pins 440 on one side and the bars or pins 442 on the other side and their associated openings are not on a single diameter but are displaced slightly from a diameter so that registry can occur only at one point over the 360° arc.

The pointer 450 (Figure 1) may be provided on the skid 94 to indicate by registry with the feed slat 90 the point at which a shift may be made.

When an adjustment is made for high speed operation of the folding plates, extra slats 90a may be attached to the chain between the original slats 90. When adjustment is made for slow speed or normal speed operation, the extra slats 90a are removed.

Where the speed changer in housing 400 is adjusted from the double speed to the normal speed, it may on occasion be necessary to adjust the original feed elements 27 so that the timing of the initial feed of the blanks will be changed.

For this purpose, shaft 204 is broken as shown particularly in Figures 1 and 2, the left side of shaft 204 being provided with the spiral gear 501 and the right side of shaft 204 carrying the frame 502 which rotatably supports the screw 503 which meshes with spiral gear 501.

Screw 503 has handle 505 which may be operated to rotate the same.

The left and right side of shafts 204 are actually integrated for normal operation by the connection between screw 503 and spiral gear 501 which is a self-locking connection.

When the angular position of the left side of shaft 204 requires adjustment to position the kicker 27 properly, then rotation of handle 505 will cause angular adjustment of the left side of shaft 204 as required.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a folding machine for forming flat, collapsed tubular box blanks from flat and scored sheets, said sheets having a pair of longitudinally extending side sections defined by score lines and foldable about said score lines into said collapsed tubular arrangement; stop members mounted on said machine; apparatus for moving said blanks successively against said stop members, means for folding over the side sections, the completion of said folding operation releasing said blanks from said stops; said folding means comprising a pair of oscillatable plates; drive mechanism for said plates; said drive mechanism including a speed changing connection, said apparatus for moving said blanks being adjustable to vary the number of blanks moved for any unit of movement of said apparatus.

2. In a folding machine for forming flat, collapsed tubular box blanks from flat and scored sheets, said sheets having a pair of longitudinally extending side sections defined by score lines and foldable about said score lines into said collapsed tubular arrangement; stop members mounted on said machine; apparatus for moving said blanks successively against said stop members, means for folding over the side sections, the completion of said folding operation releasing said blanks from said stops; said folding means comprising a pair of oscillatable plates; blank moving means for moving the folded blank from the stops; a source of driving power; a first connection from said power source to said blank moving means; a second connection from said power source to said oscillatable plates; said second connection including speed changing mechanism, said apparatus for moving said blanks being adjustable to vary the number of blanks moved for any unit of movement of said apparatus.

3. In a folding machine for forming flat, collapsed tubular box blanks from flat and scored sheets, said sheets having a pair of longitudinally extending side sections defined by score lines and foldable about said score lines into said collapsed tubular arrangement; stop members mounted on said machine; apparatus for moving said blanks successively against said stop members, means for folding over the side sections, the completion of said folding operation releasing said blanks from said stops; said folding means comprising a pair of oscillatable plates; a chain for moving the folded blank from the stops; a source of driving power; a first connection from said power source to said chain; a second connection from said power source to said oscillatable plates; said second connection including speed changing mechanism, said apparatus for moving said blanks being adjustable to vary the number of blanks moved for any unit of movement of said apparatus.

4. In a folding machine for forming flat, collapsed tubular box blanks from flat and scored sheets, said sheets having a pair of longitudinally extending side sections defined by score lines and foldable about said score lines into said collapsed tubular arrangement; stop members mounted on said machine; apparatus for moving said blanks successively against said stop members, means for folding over the side sections, the completion of said folding operation releasing said blanks from said stops; said folding means comprising a pair of oscillatable plates; a chain for moving the folded blank from the stops; a source of driving power; a first connection from said power source to said chain; a second connection from said power source to said oscillatable plates; said second connection including speed changing mechanism; a plurality of spaced slats on said chain, each slat engageable with a folded blank to move the same; said slats being removable and remountable in accordance with the setting of the speed changing mechanism.

ALBERT F. SHIELDS.

REFERENCES CITED

The following references are of record in the file of this patent:

UNITED STATES PATENTS

| Number | Name | Date |
|---|---|---|
| 1,505,178 | Wade et al. | Aug. 19, 1924 |
| 1,982,848 | Wood | Dec. 4, 1934 |
| 2,008,049 | Staude | July 16, 1935 |